Oct. 26, 1965  S. A. GETTS  3,213,716
BORING TOOL
Filed Oct. 1, 1962  2 Sheets-Sheet 1
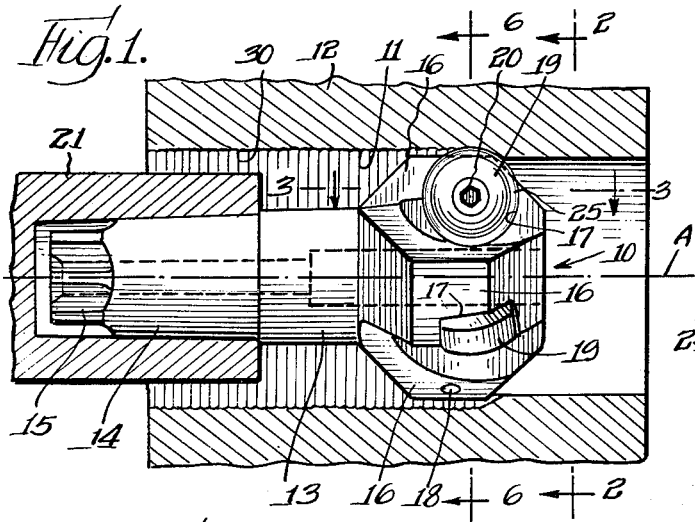
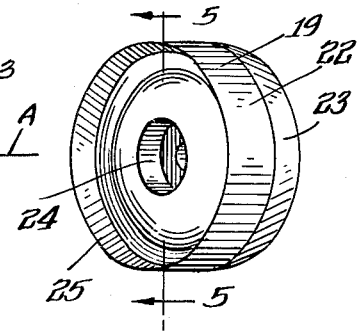
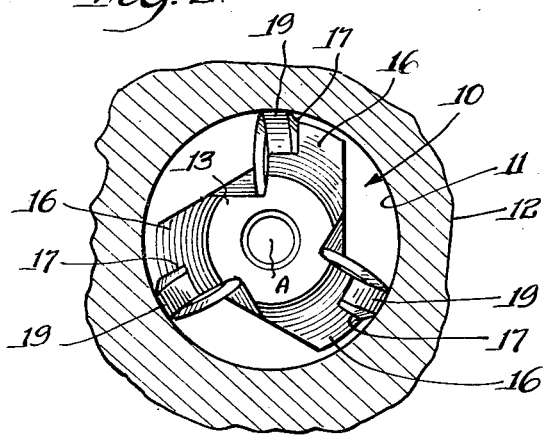
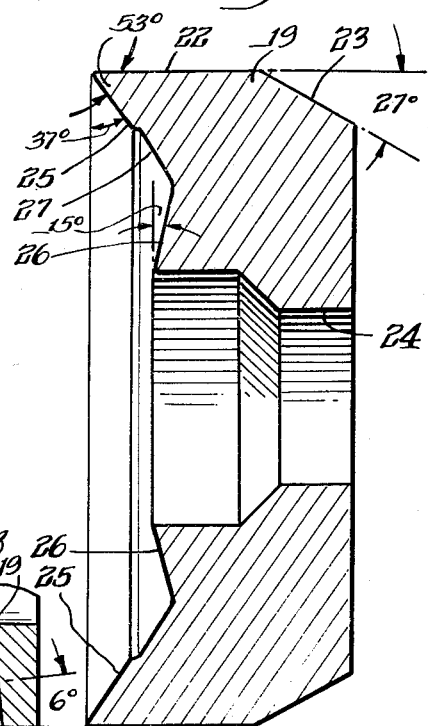
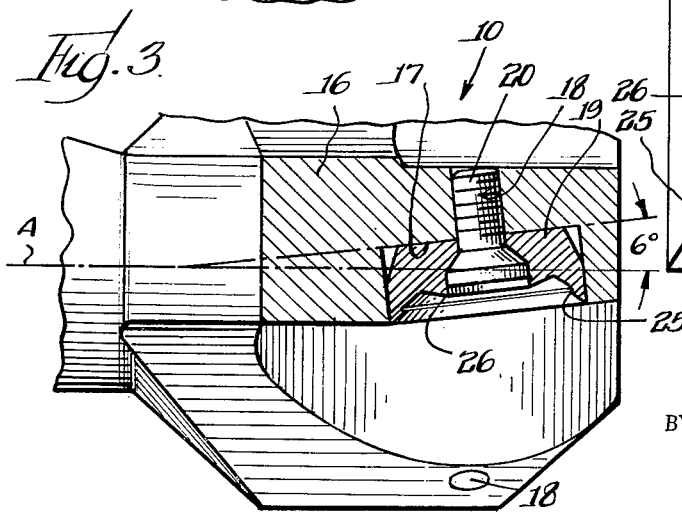
INVENTOR.
Sidney A. Getts
BY Wallenstein, Spangenberg
& Hattis
Attys Oct. 26, 1965  S. A. GETTS  3,213,716
BORING TOOL
Filed Oct. 1, 1962  2 Sheets-Sheet 2
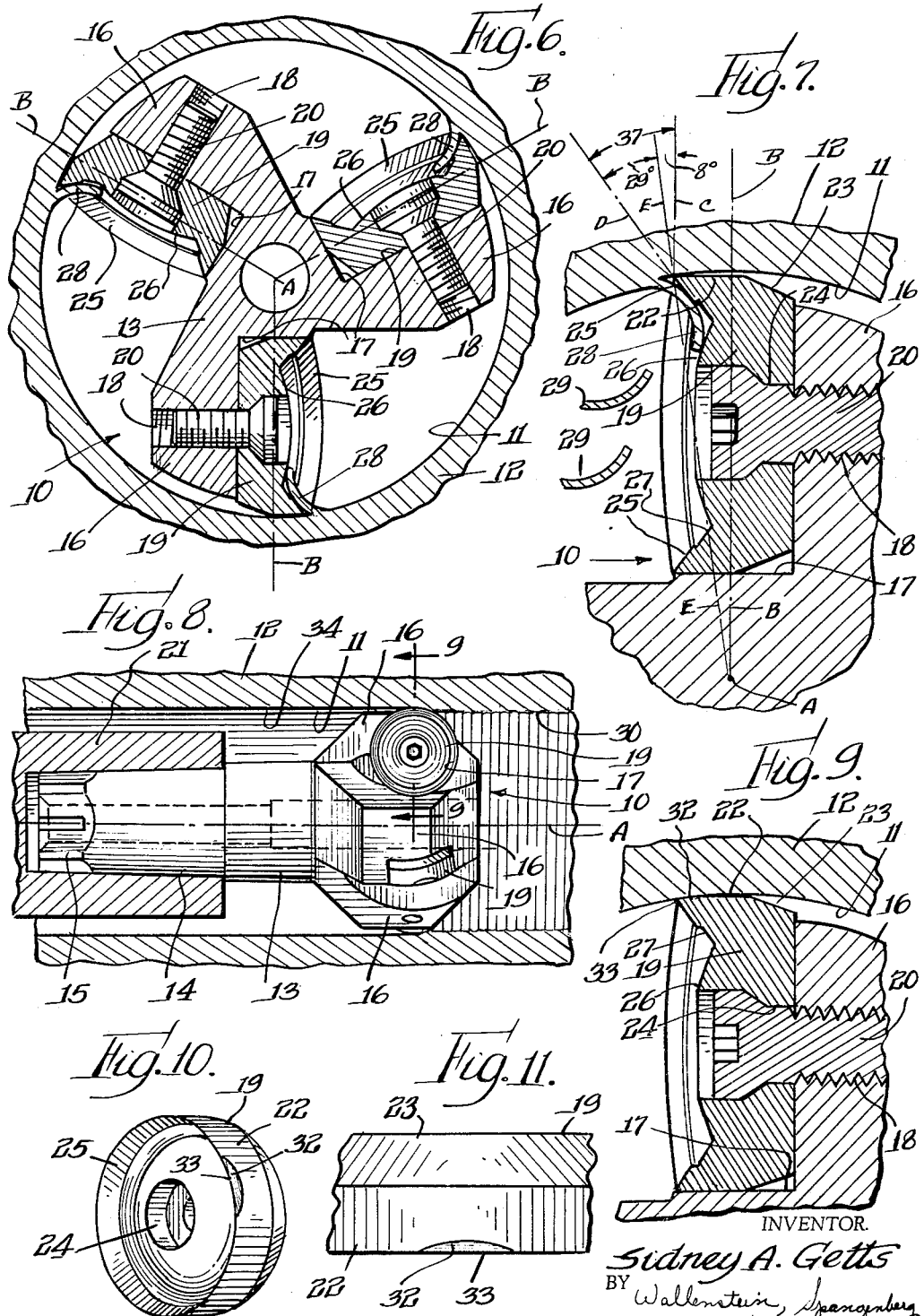
INVENTOR.
Sidney A. Getts
BY Wallenstein, Spangenberg
& Hattis
Attys.

United States Patent Office 3,213,716
Patented Oct. 26, 1965

3,213,716
BORING TOOL
Sidney A. Getts, Rockford, Ill., assignor to Metal Cutting Tools, Inc., Rockford, Ill., a corporation of Illinois
Filed Oct. 1, 1962, Ser. No. 227,197
8 Claims. (Cl. 77—58)

The principal object of this invention is to provide an improved boring tool for boring and/or reaming a hole in an article, which is capable of use in boring and/or reaming holes in various metallic articles including cast iron and the like and, more particularly, steel articles including steel forgings and the like which heretofore have been extremely difficult to bore and/or ream, which is provided with readily removable and replaceable cutter buttons, which is simple and rugged in construction, which may be readily and accurately constructed, and which accurately performs the boring and/or reaming operations.

Briefly, the boring tool of this invention includes a body which is longitudinally insertable in and relatively movable longitudinally with respect to the hole in the article and which is rotatable about its longitudinal axis. It also includes a plurality of circular cutter buttons having cutting faces which are secured to the body in substantially radially outwardly extending position with the cutting faces thereof facing substantially in the direction of rotation of the body for engaging and boring the hole in the article as the body is rotated, relief being provided at the peripheries of the cutter buttons behind the cutting faces.

In the specific embodiment herein illustrated, the peripheries of the circular cutter buttons have substantially cylindrical surfaces and, to provide relief, the cutter buttons are so mounted on the body that the cutting faces thereof are substantially parallel to radii from the longitudinal axis of the body but advanced ahead of said radii in the direction of rotation of the body a distance at least as great as one-half the width of the substantially cylindrical peripheries of the cutter buttons, and that the cutter buttons are tilted axially out of parallel with the longitudinal axis of the body toward the direction of the longitudinal boring movement of the body with respect to the hole in the article. Other ways of providing relief behind the cutting faces of the cutter buttons may be utilized if desired. The axial tilting of the cutter buttons also provides an angled cutting edge thereon to produce a slicing action in the boring of the hole in the article.

In accordance with this invention, the cutting face of each circular cutter button has a concave surface extending inwardly from the periphery thereof to form an effective positive shearing or cutting angle in the cutting face with respect to the normal or radius of the hole in the article where it is engaged by the cutting face. By reason of this positive shearing or cutting angle, powerful, accurate and clean boring of the hole in the article is afforded. This effective positive shearing or cutting angle makes it possible to bore accurately and cleanly articles of various metals, such as, cast iron and steel articles including steel forgings and the like. Effective positive shearing or cutting angles within the range of substantially 20° to 40° are suitable for boring steel articles including steel forgings and the like, and particularly fine results are obtained when the effective positive shearing or cutting angle is substantially 30°. Also, effective positive shearing or cutting angles as low as 10° are suitable for boring articles of cast iron and the like, and effective positive shearing or cutting angles as high as 50° are suitable for articles of aluminum, synthetic plastics and the like.

Preferably, the concave surface in the cutting face of the circular cutter button is a concave conical surface extending at least partially inwardly from the periphery of the cutter button so as to form a straight positive shearing or cutting angle within the aforementioned angle ranges. Also, preferably, the cutting face of the circular cutter button is provided adjacent the center thereof with a convex surface which is engaged by the cuttings from the hole in the article to control and break the cuttings into chips so as to be readily conveyed away from the boring tool. The circular cutter buttons are preferably provided with central holes through which screws extend for removably securing the cutter buttons to the body, and the convex surface at the center of the cutter buttons also serves the purpose of preventing the cuttings from fouling such holes and securing screws.

The boring tool of this invention is also admirably suited for reaming a hole in an article and, towards this end, in accordance with this invention, the periphery of each circular cutter button, at that portion of the cutting face which engages the hole in the article, is provided with a cylindrical surface substantially concentric with the longitudinal axis of the body and having a radius corresponding substantially to the radius of the reamed hole. The juncture of this cylindrical surface with the cutting face of the cutter button forms a substantially straight cutting or reaming edge which accurately reams a true cylindrical hole in the article.

Any number of circular cutter buttons may be carried by the body and the principal requirement is that they are accurately and equally radially spaced from the longitudinal axis of the body so that each cutter button performs its equal share of the boring or reaming of the hole in the article. For purposes of illustration herein, the boring tool is shown to have three equally circumferentially spaced cutter buttons.

Further objects of this invention reside in the details of construction of the boring tool and in the cooperative relationships between the component parts thereof.

Other objects and advantages of this invention will become apparent to those skilled in the art upon reference to the accompanying specification, claims and drawings in which:

FIG. 1 is a side elevational view illustrating the boring tool of this invention boring a hole in an article, the article being shown in section;

FIG. 2 is a vertical sectional view taken substantially along the line 2—2 of FIG. 1 and illustrating in elevation the forward end of the boring tool;

FIG. 3 is an enlarged horizontal sectional view taken substantially along the line 3—3 of FIG. 1;

FIG. 4 is a perspective view of one of the cutter buttons utilized in the boring tool;

FIG. 5 is an enlarged sectional view through the cutter button taken substantially along the line 5—5 of FIG. 4;

FIG. 6 is an enlarged sectional view taken substantially along the line 6—6 of FIG. 1 and illustrating the boring operation;

FIG. 7 is an enlarged sectional view of a portion of FIG. 6 showing the relationships between the cutter buttons and the hole in the article being bored;

FIG. 8 is a view similar to FIG. 1 but illustrating the boring tool operating as a reamer;

FIG. 9 is a vertical sectional view similar to FIG. 7 and taken substantially along the line 9—9 of FIG. 8 and illustrating the manner of reaming the hole in the article;

FIG. 10 is a perspective view of the cutter button utilized in the reamer of FIGS. 8 and 9; and FIG. 11 is a top plan view of the cutter button.

Referring first to FIGS. 1 to 7, one form of the boring tool of this invention is generally designated at 10, the boring tool 10 operating to bore a hole 11 in an article 12. The boring tool 10 includes a body 13 which is provided with a tapered extension 14 and a flatted end 15 for mounting the boring tool in a rotatable fixture 21 for rotating the boring tool about its longitudinal axis A. The body 13 is longitudinally insertable in and relatively movable longitudinally with respect to the hole 11 in the article 12 so that as the boring tool is rotated it is also advanced with respect to the article for boring the hole. The body 13 of the boring tool is provided with a plurality of lands 16 (three being shown for purposes of illustration) which are separated by flutes. The sides of the lands 16 in the direction of rotation of the body 13 are as provided with a cylindrical recess 17 and a concentric tapped hole 18. A circular cutter button 19 is arranged in each recess 17 and is secured in place in the recess by a screw 20 passing through a counterboard hole 24 in the cutter button 19 and screw threaded into the tapped hole 18. Thus, the circular cutter buttons are secured to the body 13 in substantially radially outwardly extending position with the cutting faces thereof facing substantially in the direction of rotation of the body for engaging and boring the hole 11 in the article as the body is rotated.

As shown more clearly in FIG. 5, each circular cutter button 19 is provided at one side with a forward cutting face and with a substantially cylindrical surface 22 on its periphery. The other side of the cutter button is provided with a conical surface 23 for relief purposes and for more readily accommodating the cutter button in the recess 17 in the body 13. The circular cutting face of the cutter button 19 has a concave conical surface 25 extending partially inwardly from the periphery thereof to form a positive cutting angle in the cutting face. The central portion of the cutter button 19 is provided with a convex surface 26 and the cutter button is undercut between the surfaces 25 and 26 as indicated at 27. As shown in connection with this specific embodiment of the cutter button 19, the included angle between the cylindrical surface 22 and the concave conical surface 25 is 53°, providing a cutting angle of 37°. The angle of the convex surface 26 is shown to be 26° and the angle of the conical surface 23 at the rear of the cutter button 19 is shown to be 27°.

In the specific embodiment illustrated, to provide for relief behind the cutting faces of the cutter buttons and to provide for a slicing cutting operation in the boring of the hole in the article, the cutter buttons 19 are set into the lands 16 of the body 13 in definite positions. As shown in FIGS. 6 and 7 the middle of each cutter button 19 is arranged substantially along a radius B extending from the longitudinal axis A, and the cutting face of the cutter button 19, as designated by the line C, is arranged substantially parallel to the radius B but advanced ahead of the radius B by the distance between the lines B and C. This distance is at least as great as one-half the width of the cylindrical periphery 22 of the cutter button. As a result, relief is provided behind the periphery of the cutting face at its outermost point as shown in FIG. 7. The relief angle at the periphery of the cutter face at its outermost point is substantially 8°. The peripheral portion of the cutter button longitudinally rearwardly from the outermost point of the cutter button, cannot engage the bored hole and, accordingly, adequate relief therefor is provided. The cutting face C where it engages at its outermost point the hole 11 in the article 12 makes an angle of substantially 8° with the radius of the hole 11 at that point. The normal to this radius is also substantially 8° with respect to the cutting face of the cutter button 19, as designated by the line E, and it also corresponds to the radius of the hole 11 where it is engaged by the periphery of the cutting face. The concave conical surface 25, as shown by the line D, which makes an angle of 37° with the cutting face of the cutter button as shown by the line C, therefore, makes an effective positive cutting angle with respect to the radius E of the hole in the article where the hole is engaged by the periphery of the cutting face of substantially 29°.

As shown in FIG. 3 the cutter button 19 is axially tilted out of parallel with the longitudinal axis A of the body 13 toward the direction of the longitudinal boring movement of the body with respect to the hole 11 in the article. This axial tilting is substantially 6° and it operates to provide relief behind the periphery of the cutting face forwardly from the outermost point of the cutter button and to provide a slanting cutting edge to provide a shearing or slicing action during the boring operation. The effective positive cutting angle in the cutting face at this longitudinally foremost point of the cutter button 19 with respect to the radius E of the hole in the article is substantially the 37° angle, minus the 6° tilting angle, and minus about 4° due to the longitudinal forward positioning of the cutter button at this longitudinally foremost point, for an effective positive cutting angle about 28°. Since the majority of the cutting performed by the cutter button 19 takes place in considerably less than about ¼ of the circumference of the cutter button longitudinally forwardly from the outermost point of the cutter button, the average effective positive cutting angle in the cutting face of the cutter button with respect to the normal or radius of the hole 11 being bored is substantially 30°. This cutting angle is particularly effective in boring steel such as steel forgings and the like. As expressed above, satisfactory results can be obtained in boring steel and the like with effective positive cutting angles in the range of substantially 20° to 40° although substantially the middle of this range is preferred.

As seen in FIGS. 6 and 7, the effective positive cutting angle efficiently and cleanly slices or shears the cuttings 28 from the article 12. These cuttings 28 engage the convex surface 26 of the cutter button 19 so that they are controlled in their advancing movement and are broken into chips 29 so as to be readily conveyed away. This convex surface 26 also operates effectively to prevent fouling of the counterbored holes 24 and the securing screws 20 which secure the cutter buttons 19 in place on the lands 16 of the body 13.

The boring tool 10, as it is rotated, is also moved longitudinally with respect to the hole 11 in boring the hole in the article and depending upon the number of cutter buttons 19 utilized and the rate of longitudinal movement of the boring tool 10, corresponding helical grooves 30 will appear in the bored hole 11, as indicated in exaggerated form in FIGS. 1 and 8. While this is maintained at a minimum and is not objectionable in most boring operations, it is sometimes desirable to provide a truly smooth bore by reaming, and this can be accomplished in accordance with this invention by the boring tool illustrated in FIGS. 8 to 11. Here, the boring tool 10 is utilized for reaming the bored hole 11 to remove the helical grooves 30 as shown in exaggerated form in FIG. 8. The boring tool 10 of FIGS. 8 to 11 is the same as that described heretofore (and like reference characters have been utilized for like parts) with the exception that the substantially cylindrical periphery 22 of each circular cutter button 19 at the portion of the cutting face which engages the hole 11 in the article 12 is provided with a cylindrical surface 32 which is substantially concentric with the longitudinal axis A of the body and which has a radius corresponding substantially to the radius of the reamed hole. The juncture of this cylindrical surface 32 with the cutting face of the cutter button 19 forms a substantially straight cutting or reaming edge 33, lying substantially in the concave cylindrical surface of the hole 11 in the article being reamed, which accurately reams a true cylindrical hole 34 in the article 12 by cutting away the helical grooves 30, as shown in FIG. 8. The length of this cylindrical surface 32 and the cutting edge 33 is correlated with the number of cutter buttons 19 and the rate of advance of the boring tool 10 with respect to the hole 11 in the article 12 to provide overlapping reaming actions by the cutter buttons.

While for purposes of illustration two forms of this invention have been disclosed, other forms thereof may become apparent to those skilled in the art upon reference to this disclosure and, therefore, this invention is to be limited only by the scope of the appended claims.

I claim as my invention:

1. A boring tool for boring a hole in a metallic article comprising, a body longitudinally insertable in and relatively movable longitudinally with respect to the hole in the article and rotatable about its longitudinal axis, a plurality of circular cutter buttons having substantially cylindrical peripheries and cutting faces, means for securing the cutter buttons to the body in substantially radially outwardly extending position, with their centers arranged in a plane normal to the longitudinal axis and equally spaced from the longitudinal axis and with the cutting faces thereof substantially parallel to radii from the longitudinal axis of the body but advanced ahead of said radii in the direction of rotation of the body a distance at least as great as one-half the width of the substantially cylindrical peripheries of the cutter buttons and with the cutter buttons axially tilted out of parallel with the longitudinal axis of the body toward the direction of the longitudinal boring movement of the body with respect to the hole in the article, for engaging the cutting faces of the cutter buttons with the hole in the article and providing relief about the substantially cylindrical peripheries of the cutter buttons behind the cutting faces thereof to bore the hole in the article as the body is rotated and longitudinally moved with respect to the hole in the article, the cutting face of each circular cutter button having a concave surface extending inwardly from the periphery thereof to form an effective positive cutting angle in the cutting face with respect to the radius of the hole in the article where the hole is engaged by the periphery of the cutting face.

2. A boring tool for boring a hole in a metallic article comprising, a body longitudinally insertable in and relatively movable longitudinally with respect to the hole in the article and rotatable about its longitudinal axis, a plurality of circular cutter buttons having substantially cylindrical peripheries and cutting faces, means for securing the cutter buttons to the body in substantially radially outwardly extending position, with their centers arranged in a plane normal to the longitudinal axis and equally spaced from the longitudinal axis and with the cutting faces thereof substantially parallel to radii from the longitudinal axis of the body but advanced ahead of said radii in the direction of rotation of the body a distance at least as great as one-half the width of the substantially cylindrical peripheries of the cutter buttons and with the cutter buttons axially tilted out of parallel with the longitudinal axis of the body toward the direction of the longitudinal boring movement of the body with respect to the hole in the article, for engaging the cutting faces of the cutter buttons with the hole in the article and providing relief about the substantially cylindrical peripheries of the cutter buttons behind the cutting faces thereof to bore the hole in the article as the body is rotated and longitudinally moved with respect to the hole in the article, the cutting face of each circular cutter button having a concave surface extending inwardly from the periphery thereof to form an effective positive cutting angle in the cutting face with respect to the radius of the hole in the article where the hole is engaged by the periphery of the cutting face, the effective positive cutting angle being within the range of substantially 10° to 50°.

3. A boring tool for boring a hole in a metallic article comprising, a body longitudinally insertable in and relatively movable longitudinally with respect to the hole in the article and rotatable about its longitudinal axis, a plurality of circular cutter buttons having substantially cylindrical peripheries and cutting faces, means for securing the cutter buttons to the body in substantially radially outwardly extending position, with their centers arranged in a plane normal to the longitudinal axis and equally spaced from the longitudinal axis and with the cutting faces thereof substantially parallel to radii from the longitudinal axis of the body but advanced ahead of said radii in the direction of rotation of the body a distance at least as great as one-half the width of the substantially cylindrical peripheries of the cutter buttons and with the cutter buttons axially tilted out of parallel with the longitudinal axis of the body toward the direction of the longitudinal boring movement of the body with respect to the hole in the article, for engaging the cutting faces of the cutter buttons with the hole in the article and providing relief about the substantially cylindrical peripheries of the cutter buttons behind the cutting faces thereof to bore the hole in the article as the body is rotated and longitudinally moved with respect to the hole in the article, the cutting face of each circular cutter button having a concave surface extending inwardly from the periphery thereof to form an effective positive cutting angle in the cutting face with respect to the radius of the hole in the article where the hole is engaged by the periphery of the cutting face, the effective positive cutting angle being within the range of substantially 20° to 40°.

4. A boring tool for boring a hole in a metallic article comprising, a body longitudinally insertable in and relatively movable longitudinally with respect to the hole in the article and rotatable about its longitudinal axis, a plurality of circular cutter buttons having substantially cylindrical peripheries and cutting faces, means for securing the cutter buttons to the body in substantially radially outwardly extending position, with their centers arranged in a plane normal to the longitudinal axis and equally spaced from the longitudinal axis and with the cutting faces thereof substantially parallel to radii from the longitudinal axis of the body but advanced ahead of said radii in the direction of rotation of the body a distance at least as great as one-half the width of the substantially cylindrical peripheries of the cutter buttons and with the cutter buttons axially tilted out of parallel with the longitudinal axis of the body toward the direction of the longitudinal boring movement of the body with respect to the hole in the article, for engaging the cutting faces of the cutter buttons with the hole in the article and providing relief about the substantially cylindrical peripheries of the cutter buttons behind the cutting faces thereof to bore the hole in the article as the body is rotated and longitudinally moved with respect to the hole in the article, the cutting face of each circular cutter button having a concave surface extending inwardly from the periphery thereof to form an effective positive cutting angle in the cutting face with respect to the radius of the hole in the article where the hole is engaged by the periphery of the cutting face, the effective positive cutting angle being substantially 30°.

5. A boring tool for reaming a hole in a metallic article comprising, a body longitudinally insertable in and relatively movable longitudinally with respect to the hole in the article and rotatable about its longitudinal axis, and a plurality of substantially radially outwardly extending circular cutter buttons having their centers arranged in a plane normal to the longitudinal axis and equally spaced from the longitudinal axis and secured to the holder and having cutting faces facing substantially in the direction of rotation of the body for engaging and reaming the hole in the article as the body is rotated, the periphery of each circular cutter button at that portion of the cutting face which engages the hole in the article being provided with a cylindrical surface substantially concentric with the longitudinal axis of the body and having a radius corresponding substantially to the radius of the reamed hole.

6. A boring tool for reaming a hole in a metallic article comprising, a body longitudinally insertable in and relatively movable longitudinally with respect to the hole in the article and rotatable about its longitudinal axis, and a plurality of substantially radially outwardly extending circular cutter buttons having their centers arranged in a plane normal to the longitudinal axis and equally spaced from the longitudinal axis and secured to the holder and having cutting faces facing substantially in the direction of rotation of the body for engaging and reaming the hole in the article as the body is rotated, the cutting face of each circular cutter button having a concave surface extending inwardly from the periphery thereof to form an effective positive cutting angle in the cutting face with respect to the radius of the hole in the article where the hole is engaged by the periphery of the cutting face, the periphery of each circular cutter button at that portion of the cutting face which engages the hole in the article being provided with a cylindrical surface substantially concentric with the longitudinal axis of the body and having a radius corresponding substantially to the radius of the reamed hole.

7. A boring tool for reaming a hole in an article comprising, a body longitudinally insertable in and relatively movable longitudinally with respect to the hole in the article and rotatable about its longitudinal axis, a plurality of circular cutter buttons having substantially cylindrical peripheries and cutting faces, means for securing the cutter buttons to the body in substantially radially outwardly extending position, with the cutting faces thereof subsantially parallel to radii from the longitudinal axis of the body but advanced ahead of said radii in the direction of rotation of the body a distance at least as great as one-half the width of the substantially cylindrical peripheries of the cutter buttons and with the cutter buttons axially tilted out of parallel with the longitudinal axis of the body toward the direction of the longitudinal reaming movement of the body with respect to the hole in the article, for engaging the cutting faces of the cutter buttons with the hole in the article and providing relief about the substantially cylindrical peripheries of the cutter buttons behind the cutting faces thereof to ream the hole in the article as the body is rotated and longitudinally moved with respect to the hole in the article, the substantially cylindrical periphery of each circular cutter button at that portion of the cutting face which engages the hole in the article being provided with a cylindrical surface substantially concentric with the longitudinal axis of the body and having a radius corresponding substantially to the radius of the reamed hole.

8. A boring tool for reaming a hole in an article comprising, a body longitudinally insertable in and relatively movable longitudinally with respect to the hole in the article and rotatable about its longitudinal axis, a plurality of circular cutter buttons having substantially cylindrical peripheries and cutting faces, means for securing the cutter buttons to the body in substantially radially outwardly extending position, with the cutting faces thereof substantially parallel to radii from the longitudinal axis of the body but advanced ahead of said radii in the direction of rotation of the body a distance at least as great as one-half the width of the substantially cylindrical peripheries of the cutter buttons and with the cutter buttons axially tilted out of parallel with the longitudinal axis of the body toward the direction of the longitudinal reaming movement of the body with respect to the hole in the article, for engaging the cutting faces of the cutter buttons with the hole in the article and providing relief about the substantially cylindrical peripheries of the cutter buttons behind the cutting faces thereof to ream the hole in the article as the body is rotated and longitudinally moved with respect to the hole in the article, the cutting face of each circular cutter button having a concave surface extending inwardly from the periphery thereof to form an effective positive cutting angle in the cutting face with respect to the radius of the hole in the article where the hole is engaged by the periphery of the cutting face, the substantially cylindrical periphery of each circular cutter button at that portion of the cutting face which engages the hole in the article being provided with a cylindrical surface substantially concentric with the longitudinal axis of the body and having a radius corresponding substantially to the radius of the reamed hole.

References Cited by the Examiner

UNITED STATES PATENTS

| | | | |
|---|---|---|---|
| 2,630,725 | 3/53 | Black | 77—58 |
| 2,885,766 | 5/59 | Ernst et al. | |

FOREIGN PATENTS

| | | |
|---|---|---|
| 331,170 | 7/03 | France. |
| 329,395 | 11/20 | Germany. |
| 386,505 | 12/23 | Germany. |
| 587,854 | 5/47 | Great Britain. |
| 608,919 | 9/48 | Great Britain. |

WILLIAM W. DYER, JR., *Primary Examiner.*

JOHN C. CHRISTIE, LEON PEAR, *Examiners.*